(12) United States Patent
Christensen et al.

(10) Patent No.: US 10,011,010 B2
(45) Date of Patent: Jul. 3, 2018

(54) DRY ADHESIVES FOR ENHANCING GROUND REACTION FORCES SUBSTANTIALLY BEYOND FRICTION

(71) Applicant: The Board of Trustees of the Leland Stanford Junior University, Palo Alto, CA (US)

(72) Inventors: David L. Christensen, Los Altos, CA (US); Elliot W. Hawkes, San Francisco, CA (US); Mark R Cutkosky, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 381 days.

(21) Appl. No.: 14/952,228

(22) Filed: Nov. 25, 2015

(65) Prior Publication Data

US 2016/0199976 A1    Jul. 14, 2016

Related U.S. Application Data

(60) Provisional application No. 62/103,175, filed on Jan. 14, 2015.

(51) Int. Cl.
*B62D 57/024* (2006.01)
*B25J 7/00* (2006.01)
*B62D 57/032* (2006.01)

(52) U.S. Cl.
CPC .............. *B25J 7/00* (2013.01); *B62D 57/024* (2013.01); *B62D 57/032* (2013.01); *Y10S 901/01* (2013.01); *Y10S 901/14* (2013.01)

(58) Field of Classification Search
CPC ..... B62D 57/00; B62D 57/024; B62D 57/032
See application file for complete search history.

(56) References Cited

U.S. PATENT DOCUMENTS

| | | | |
|---|---|---|---|
| 2003/0124312 A1* | 7/2003 | Autumn | B32B 3/266 428/141 |
| 2012/0168233 A1* | 7/2012 | Clark | H01L 41/094 180/8.1 |
| 2015/0014095 A1* | 1/2015 | King | E04G 3/325 182/129 |

OTHER PUBLICATIONS

Seitz, et al, "Bio-inspired mechanisms for inclined locomotion in a legged insect-scale robot", Proceedings of the 2014 IEEE International Conference on Robotics and Biomimetics, Dec. 5-10, 2014, Bali, Indonesia, pp. 791-796.*

* cited by examiner

*Primary Examiner* — Jeffry H Aftergut
(74) *Attorney, Agent, or Firm* — Lumen Patent Firm (57) ABSTRACT

A method of towing or pushing an object using a micro-robot is provided that includes attaching a micro-robot, using a first dry adhesive, to a surface, where the dry adhesive includes micro wedges, where the micro wedges are attached to the surface when the micro wedges are in a deformed state, applying a load to the attached micro-robot, advancing the micro-robot, using a lifting element, where the lifting element includes a uni-directional footing, where the lifting element is disposed to detach the first dry adhesive and advance the micro-robot across the surface while the uni-directional footing is attached to the surface, where the detached first dry adhesive includes micro wedges in an free-standing state, where the load is advanced across the surface.

6 Claims, 5 Drawing Sheets

FIG. 8B image# DRY ADHESIVES FOR ENHANCING GROUND REACTION FORCES SUBSTANTIALLY BEYOND FRICTION

CROSS-REFERENCE TO RELATED APPLICATIONS

This application claims priority from U.S. Provisional Patent Application 62/103,175 filed Jan. 14, 2015, which is incorporated herein by reference.

STATEMENT OF GOVERNMENT SPONSORED SUPPORT

This invention was made with Government support under contract HR0011-12-C-0040 awarded by the Defense Advanced Research Project Agency. The Government has certain rights in the invention.

FIELD OF THE INVENTION

The current invention relates generally to micro-robots. More specifically, the invention relates to micro-robots that are capable of towing objects that are several hundred times their body weight.

BACKGROUND OF THE INVENTION

There are numerous instances micro-robots, many of which require powered external infrastructure such as large electromagnets, surfaces with local magnetic fields, capacitive electrode surfaces) or similar provisions. Even with the powered external infrastructure, they can apply only minute interaction forces with their environments. In contrast, insects such as weaver ants have no required infrastructure yet can exert substantial forces when normalized to bodyweight.

At small scales, insects exploit interaction forces like adhesion that, unlike coulomb friction, scale with area and do not depend on the magnitude of a normal force. There are many examples of insects that use adhesive pads, scopulae, and other microscopic features to attach to surfaces; with these features, insects can apply interaction forces many times their body weight.

However, adhesion without a method of release is not useful; an insect or robot would become stuck and could not move. This problem has been reported for both small robots and moving MEMS devices. In addition, at smaller scales, legged locomotion requires higher step rates than at larger scales to maintain the same absolute velocity. Therefore, adhesives must engage and disengage more quickly at small scales. To allow easy and fast release of adhesion, an insect or microrobot needs a controllable adhesive that can be activated for applying large interaction forces when required, and deactivated for locomotion with low energy expenditure. Indeed, most insects that use various forms of adhesive pads have controllable adhesion.

What is needed is a method of enabling small robots to move easily and apply interaction forces that are orders of magnitude larger than their weights using controllable dry adhesive that function on a variety of smooth surfaces and allow both large force generation and high step rates.

SUMMARY OF THE INVENTION

To address the needs in the art, a method of towing or pushing an object using a micro-robot is provided that includes attaching a micro-robot, using a first dry adhesive, to a surface, where the dry adhesive includes micro wedges, where the micro wedges are attached to the surface when the micro wedges are in a deformed state, applying a load to the attached micro-robot, advancing the micro-robot, using a lifting element, where the lifting element includes a unidirectional footing, where the lifting element is disposed to detach the first dry adhesive and advance the micro-robot across the surface while the uni-directional footing is attached to the surface, where the detached first dry adhesive includes micro wedges in an free-standing state, where the load is advanced across the surface.

According to one aspect of the invention, the displaced load includes pulling or hoisting the load along the surface.

In another aspect of the invention, the surface includes an angle from 0 to 90 degrees.

In a further aspect of the invention, the micro robot includes a winch, where a tether of the winch is connected to the load.

In yet another aspect of the invention, the uni-directional footing can be a second dry adhesive, or a uni-directional wheel.

According to one aspect of the invention, the micro-robot includes a gate speed in a range of 0 to 60 Hz.

In another aspect of the invention, each micro-robot advancement includes a step length in a range of 50 μm to 6 inches.

BRIEF DESCRIPTION OF THE DRAWINGS

FIGS. 1A-1B show FIG. 1A the limit curve of safe normal and shear stresses for the directional adhesives; FIG. 1A bandwidth over which the adhesives are able to provide useful levels of adhesion, where the rolloff at the corner frequency is quite sharp, and small experimental variance produces a larger uncertainty in the failure stress beyond this point, according to one embodiment of the invention.

FIGS. 8A-8B show FIG. 8A the measured ground reaction forces for the winched μTug pulling 22.5 kg of weightlifting weights (or about two thousand times its weight) 1 mm on glass, where it is noted the incidental normal force during the maneuver is equal to about 50 robot body weights in the upward direction, a feat only possible with adhesion.

DETAILED DESCRIPTION

The controllable adhesives used by insects to both carry large loads and move quickly despite their small scale inspires the μTug robot concept. These are small robots that can both move quickly and use controllable adhesion to apply interaction forces many times their body weight. The adhesives enable these autonomous robots to accomplish this feat on a variety of common surfaces without complex infrastructure. The benefits, requirements, and theoretical efficiency of the adhesive in this application are discussed as well as the practical choices of actuator and robot working surface material selection. A robot actuated by piezoelectric bimorphs demonstrates fast walking with a no-load rate of 50 Hz and a loaded rate of 10 Hz. A 12 g shape memory alloy (SMA) actuated robot demonstrates the ability to load more of the adhesive enabling it to tow 6.5 kg on glass (or 500 times its body weight). Continuous rotation actuators (electromagnetic in this case) are demonstrated on another 12 g robot give it nearly unlimited work cycles through gearing. This leads to advantages in towing capacity (up to 22 kg or over 1800 times its body weight), step size, and efficiency. The current invention includes using such an adhesive system that enables small robots to provide truly human scale interaction forces, despite their size and mass. This enables future microrobots to not only sense the state of the human environment in which they operate, but apply large enough forces to modify it in response.

Regarding force generation, the dry adhesives used for this work generate adhesion using van der Waals interactions at densely arrayed contact sites. The adhesive is composed of a series of 100 μm wedges made of silicone rubber. When placed on a surface, the wedges only make contact with their tips, with a very small area of contact. When the adhesives are loaded in shear, the wedges bend over to contact the surface on their sides. This deformation increases the real area of contact and gives the system more adhesive capability. When the shear force is removed, the wedges return to their original shape, disengaging the adhesive. Such an adhesive is defined as directional and controllable: the adhesion is controlled by an externally applied shear load. There have been many adhesive designs that are directional and could be possibly used for miniature tugging robots, but because they are not controllable through shear load, would require alternative methods to turn on and off.

Figure 1A:
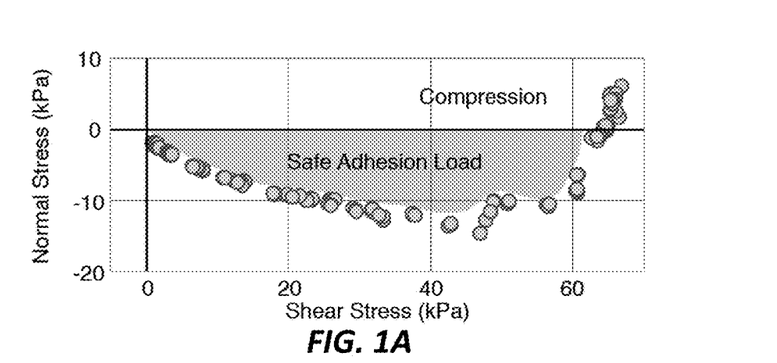

Once engaged, the adhesive can generate an adhesive stress in both the normal (15 kPa) and shear directions (70 kPa in the preferred direction). FIG. 1A shows the limit curve for this adhesive, indicating the magnitude of combined shear and normal pressure the adhesive can support on glass.

Figure 2:
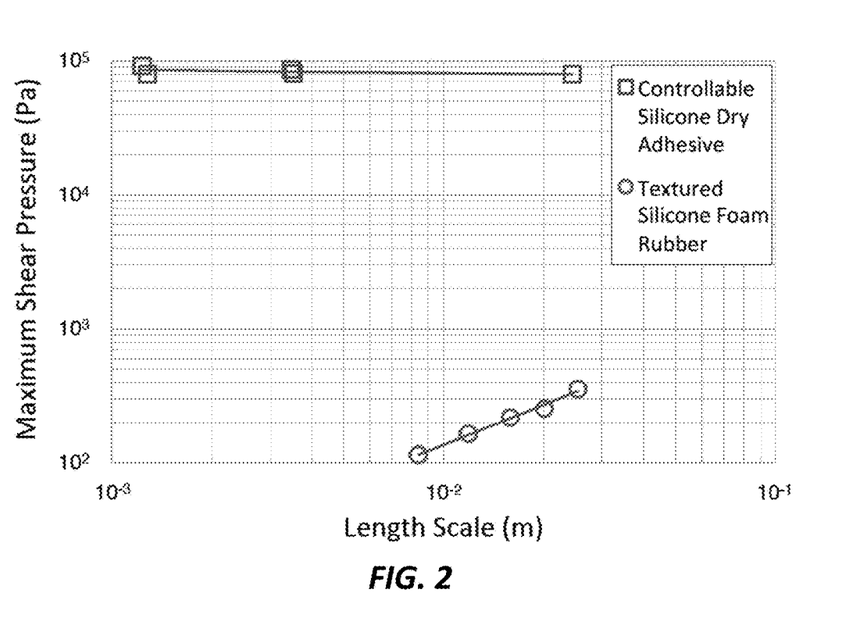
FIG. 2 shows the maximum shear stress while scaling a simple 25 mm silicone rubber cube (circle), and an equally sized cube with a dry adhesive (square). Note that while the available shear force decreases with robot size (with a scaling fit of $A^{0.977}$), dry adhesives give constant shear stress (with a scaling fit of $A^{-0.024}$), where the data are from pull tests on glass, according to one embodiment of the invention.

The key advantage of using this type of adhesive is that the available shear force does not require a normal load. A robot using friction has a peak force limited by μ·mg, which scales as the length cubed. Adhesion, in contrast, scales only as the contact area, or length squared. This means that using an adhesive to generate ground reaction forces becomes advantageous at small size scales as shown in FIG. 2, which compares pull test data against glass, taken for small cubes of dense silicone rubber foam versus a foam cube of the same size with a dry adhesive patch on its lower surface.

Regarding the cycle speed, while traditional pressure sensitive adhesives would work well for generating ground reaction forces, detachment of the adhesive must be considered. Tape peeling is a slow process; the peel propagates from one end to the other, taking significant time and mechanical work.

Figure 1B:
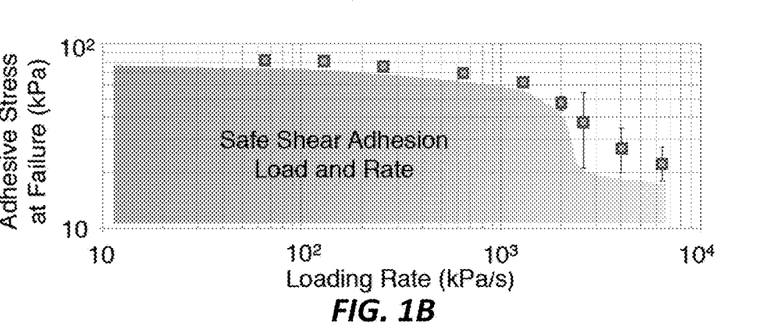

The fibrillar adhesive used in this exemplary embodiment accelerates this process by parallelizing it; each microwedge is a peeling zone so that detachment is rapid. Tests with controlled shear forces and measured adhesive forces show that the adhesive can release from 80% of full load with a time constant of approximately 9 ms. Similarly, engagement occurs in parallel over many wedges, and therefore can be fast. FIG. 1B shows the maximum supported shear stress vs. loading rate characteristics of the adhesive, and shows that the performance only begins to drop off around 1 MPa/s. Combining the release time and engagement rate we get a minimum cycle time to 80% load of 77 ms, which is a combined cycle rate of 13 Hz. Because the adhesion is controlled by the applied shear, the amount of adhesion will only be the amount required for a task, and lightly loaded adhesives will therefore operate at a faster overall rate.

Finally, since the adhesive is controlled by the applied shear load, engagement and disengagement can be synchronized to the gait of a robot. If done correctly, this alleviates the need for a release actuator or careful phasing of the engagement and peeling processes that would be necessary to achieve a high step rate with an active adhesive disengagement system.

Regarding engagement work, while the benefits of a controllable, directional fibrillar adhesive are useful, they also come with a cost. Adhesion is an energetically favorable state, and disengaging adhesion requires work. The adhesive used here uses spring energy stored in the wedges to disengage; this energy is added to the system in the process of engaging the adhesive. This mechanism has the advantage of only requiring one actuator, as the force required to engage the adhesives is in the loading direction.

The quasi-static thermodynamic energy of adhesion for bulk PDMS is 0.047 mJ/m$^2$. However, even at 70 μm/s, the work required for peeling at an angle of 40° is 0.2 Jm$^2$. To disengage the adhesives controllably and quickly upon release (much faster than 70 μm/s), there must be substantially more energy contained within the springs than the minimum required for quasi-static disengagement. In the case of this adhesive, that energy is about 3 J/m$^2$.

Figure 3A:
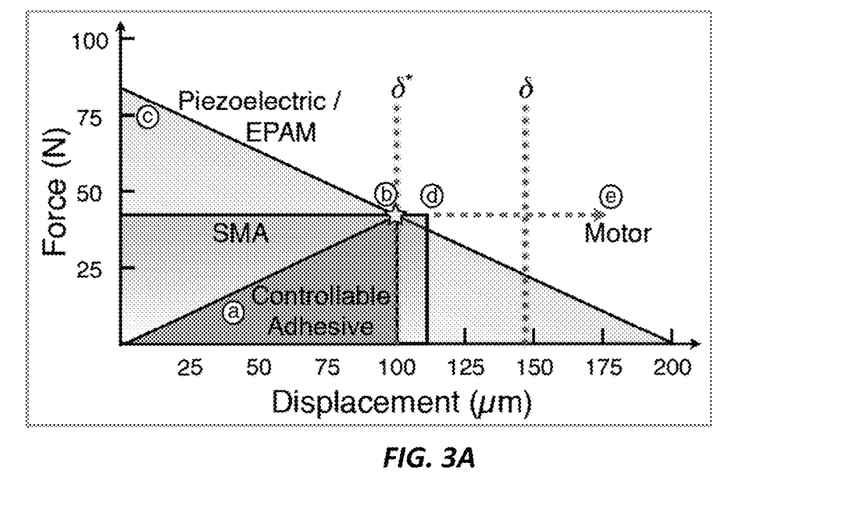
FIGS. 3A-3C show FIG. 3A (region a) the required work for loading 25 mm square adhesive, where due to actuator force-displacement shape mismatch, piezoelectric and EPAM actuators (region c) require a stated work cycle capability of at least four times this minimum value to achieve full engagement (region b), the SMA (region d) and motors (region e) are a better match, only wasting half of their work cycle specification, up to the star symbol at center, where the unused actuator capability becomes less important with a larger the total work per cycle, FIG. 3B the micrographs showing source of required work, and FIG. 3C the adhesive wedges deforming under load, according to one embodiment of the invention.
Figure 3B:
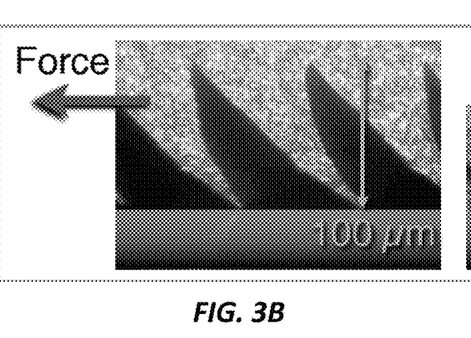
Figure 3C:
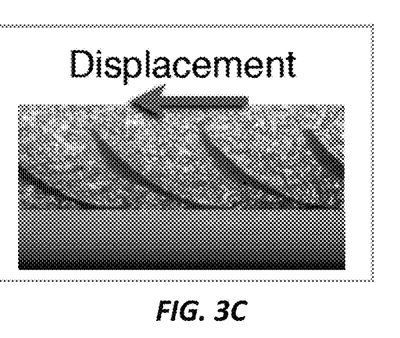

In FIG. 3 region (a) shows the force-displacement profile for a 25 mm square patch of adhesives (assuming the force displacement curve to be linear). This represents the minimum spring energy necessary for the system to operate at full load. Any real system will have additional springs that will be loaded and other losses, but the adhesives themselves need at least this force and displacement to function at maximum capacity. Therefore a robot that fully uses this adhesive must have at least this work available per cycle in its actuators to engage and disengage the adhesion. As with insects, the work required per cycle reduces with decreased loading because the adhesive only engages the amount necessary to support the load.

The choice of working surface material presents a unique opportunity to maximize the effective impact of the adhesive robot. While choosing a material on which the adhesive performs well is a minor task, it is this measure combined with the force required to move the payload that matters. At the limit of function, the maximum adhesive shear force, $F_s$, on the work surface will equal the friction of the maximum draggable payload or $F_p$. For a stainless steel payload, $$F_s = F_p = \mu_{ss} m_p g \quad (1)$$

where $\mu_{ss}$ is the coefficient of friction for the payload on the work surface, $m_p$ is the mass of the payload in kg, and g is the acceleration due to gravity in m/s². A normalized performance metric is defined as:

$$\frac{m_p}{m_r} = \frac{F_s}{\mu_{ss} \cdot m_r g} \quad (2)$$

where $m_r$ is the mass of the robot in kg. For example, if an ant has a normalized performance of 100, then it can drag 100 times its weight.

Figure 4:
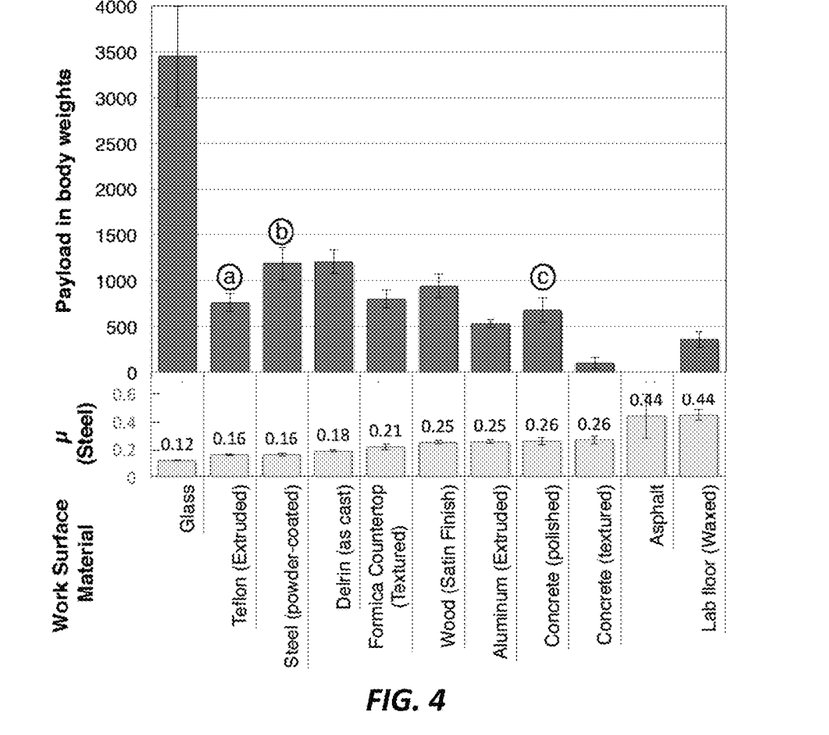
FIG. 4 shows the effective dragging payload capacity (in robot body weights) for a 12 g, 25 mm cube robot on a variety of surfaces sorted by coefficient of friction (also shown for reference), according to one embodiment of the invention.

FIG. 4 shows a range of measured coefficients of friction with corresponding normalized performances. A 1 kg machined stainless steel lab weight was used to measure coefficients of friction. Normalized performance was measured using a 25 mm square robot weighing 12 g with controllable adhesive on the bottom. Note that the results are not strictly correlated with the coefficients of friction. Teflon™ (a) and powder-coated steel (b) have very different adhesive performances yet similar coefficients of friction. Teflon™ and polished concrete (c) have similar normalized payload performances but substantially different friction.

Glass has a very low coefficient of friction for steel, and provides the highest measured adhesive performance for these adhesives. This combination predicts that a 12 g, 25 mm robot can move a payload over three thousand times its weight. If an adhesive robot system design chooses one material on which to operate, these common, low cost, smooth surfaces are a good choice. As seen in FIG. 4, the adhesive system is flexible. Although performance is excellent on glass, the system maintains good performance on a variety of surfaces.

Turning now to actuator selection, for the exemplary 25 mm square robot embodiment, the actuator is to produce 2 mJ of work per cycle, at minimum. There is an additional requirement that the shape of the force-displacement curve be compatible with the adhesive system. Fully engaging the adhesive requires a motion of 100 μm, and so the actuator must be capable at least this displacement for full use.

Solid state actuators are an attractive candidate for actuation of small robots as they are comparatively easy to manufacture at small sizes. TABLE I summarizes some common actuators, including available solid state ones, and the effect of these requirements for the proposed robot.

TABLE I

Work cycles per actuation stroke of a variety of state of the art actuators

| | Cycle Work (J/kg) | Volume Fraction for 25 mm Cube Robot | Cycle Rate | Actuator Efficiency | Notes |
|---|---|---|---|---|---|
| Piezoelectric Bimorph (PZT) | 2 J/kg | 54% (w/o power supply) | Very High | 10%-30% | 100 s of Volts |
| Electroactive Polymers (dielectric) | 40 J/kg | 2.4% (w/o power supply) | High | 60%-90% | 1000 s of Volts |
| Shape Memory Alloy Wire (Nitinol) | 466 J/kg | 0.012% (w/o large battery) | Slow | <5% | large battery required |
| Servo Motor and Gearbox (HS-35HD) | Un-defined (Geared) | 14% | Un-defined (Geared) | ~20% | Minimal accessories required |

These force and displacement requirements make the most common solid-state actuators difficult to use. Piezoelectric materials, particularly PZT, have high power densities but achieve these powers largely by performing many low-work cycles per second. This means there will have to be a lot of piezoelectric material in the robot to meet the work cycle constraint. Secondly, without some form of mechanical amplification, the displacements are small (≈300 ppm) but with large force. This is poorly matched to the force-displacement curves of the adhesive. The basic bimorph design amplifies the motion at the expense of force making it more practical. Further mechanical amplification is certainly possible, but adds complexity and extra compliance that must be overcome. In addition the resonant frequency of the actuator is reduced by adding mass at the extents, reducing the effective cycle rate.

Finally the shape of the force-displacement curve is reversed for many of these solid-state actuators. Unlike the adhesive wedges, they make peak force at zero displacement and zero force at maximum displacement. Piezoelectric and electroactive polymer actuators both have this characteristic shape. This mismatch increases the effective actuator work by a factor of 4 for this class of actuators (FIG. 3 region c).

Shape memory alloy (FIG. 3 region d) is a good choice for both its high cycle work and good displacement matching to the adhesive system. Its relatively low speed however will not take advantage of the adhesive system's speed capabilities, and its poor efficiency will require large batteries and high current drivers for practical use.

If the robot is large enough to use small electromagnetic or piezoelectric motors and gearboxes, there are some potential advantages. A possible increase in efficiency compared to SMA, and a force profile tunable through gearing, present an opportunity to bypass some of the previously discussed constraints. Even if the engagement and disengagement of the adhesives represents a tiny amount of energy per cycle, this energy is also a fixed loss. It is therefore preferable for the sake of efficiency to take as large a stroke as possible rather than simply meeting these minimum requirements for locomotion. A continuously rotating actuator allows near arbitrarily large work cycles as shown in FIG. 3 region e.

An expression can be derived for the efficiency of a robot using these adhesives as follows:

$$\eta = \begin{cases} 0 & \text{if } \delta \leq \delta^* \\ \dfrac{\int_{\delta^*}^{\delta} f \, d\delta}{\int_0^{\delta^*} f \, d\delta + \int_{\delta^*}^{\delta} f \, d\delta} & \text{if } \delta > \delta^* \end{cases} \quad (3)$$

where δ is the step size, δ* is the displacement required to load the adhesives (as defined in FIG. 3), and f is the force applied by the actuator.

Assuming a linear force profile for the adhesives, and assuming the actuator capable of matching the force profile, we can simplify this expression to the maximum efficiency of a robot using these adhesives:

$$\eta_{max} = \begin{cases} 0 & \text{if } \delta \leq \delta^* \\ \dfrac{\delta - \delta^*}{\delta - \dfrac{1}{2}\delta^*} & \text{if } \delta > \delta^* \end{cases} \quad (4)$$

where $\eta_{max}$ is the maximum efficiency possible due to adhesive loading. Naturally, there will be additional spring losses as well as other inefficiencies in any real system.

A robot that moves its payload 100 μm while requiring the full 100 μm of adhesive engagement will be at most 66% efficient. A locomotion efficiency of 90% is only theoretically possible with a step size ≥450 μm given these adhesives. This motivates building a robot capable of taking large steps (δ>>δ*), i.e. a motor-based robot. As the load decreases, δ* decreases, so lightly loaded adhesives will also be more efficient for a given step size.

The inventors have constructed a variety of robots to explore different features of the μTugs invention. The commercially available "Hexbug"™ (Innovation First, Inc.) Hexapod™ walking robot was tested to provide a point of reference. Detailed specifications for each robot can be found in TABLE II.

TABLE II

Comparison of demonstration robots presented in this paper to a simple commercially available robot.

|  | Commercial Walking Robot "Hexbug" | Winched μTug | SMA μTug | Piezo μTug |
|---|---|---|---|---|
| Length | 50 mm | 25 mm | 150 mm w/Tail | 32 mm |
| Width | 60 mm | 35 mm | 25 mm | 32 mm |
| Height | 30 mm | 25 mm | 20 mm | 20 mm |
| Mass | 12.8 g | 13.7 g | 13 g | 4.9 g |
| Max Tow Force | 0.09 N | 45 N | 20 N | 0.06 N |
| Step Rate | 5 Hz | 0.2-2 Hz | ~0.5 Hz | 30 Hz |
| Step Size | 5 mm | 5-20 mm | 2 mm | 0.4 mm |

Figure 5:
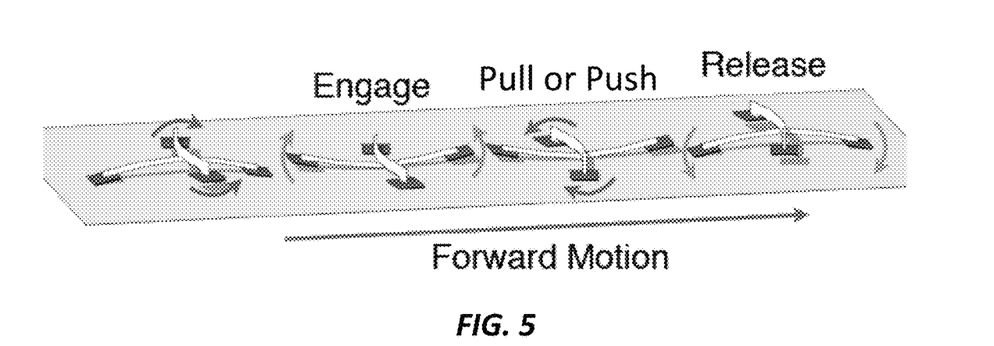
FIG. 5 shows an exemplary piezo-based walker with a 5.6 g mass (including dummy electronic/battery payload) dragging 56 g on glass while taking 15 steps per second, where the ultimate limit was found to be the actuator stiffness and work generating ability, not a lack of ability to achieve ground reaction force, according to one embodiment of the invention.

To show the speed capabilities of the adhesive system, a walking robot was constructed as seen in FIG. 5. Actuation of the legs is provided by two piezoelectric bimorphs; activating them out of phase results in a semicircular trajectory at alternating pairs of legs, moving the robot forward. The robot was able to take light steps up to about 50 Hz. Maximum step size was 500 μm, but the stiffness and force output of the actuators limited performance, resulting in shorter steps at higher loads. Peak towing performance was obtained operating at 10 Hz, with the robot dragging 56 g or 10 times its body mass on glass. This result was limited by the force and displacement available from the actuators as well as their stiffness, not the limits of the adhesive, which could achieve an order of magnitude larger shear adhesion.

According to one embodiment, the invention includes a method of towing or pushing an object using a micro-robot is provided that includes attaching a micro-robot, using a first dry adhesive, to a surface, where the dry adhesive includes micro wedges, where the micro wedges are attached to the surface when the micro wedges are in a deformed state, applying a load to the attached micro-robot, advancing the micro-robot, using a lifting element, where the lifting element includes a uni-directional footing, where the lifting element is disposed to detach the first dry adhesive and advance the micro-robot across the surface while the uni-directional footing is attached to the surface, where the detached first dry adhesive includes micro wedges in an free-standing state, where the load is advanced across the surface.

Embodiments of the invention have, the displaced load includes pulling or hoisting the load along the surface, where the surface includes an angle from 0 to 90 degrees. Further, the micro robot can include a winch, where a tether of the winch is connected to the load. In yet another aspect of the invention, the uni-directional footing can be a second dry adhesive, or a uni-directional wheel. The micro-robot can have a gate speed in a range of 0 to 60 Hz, and a step length in a range of 50 microns to 6 inches.

Figures 6A, 6B:
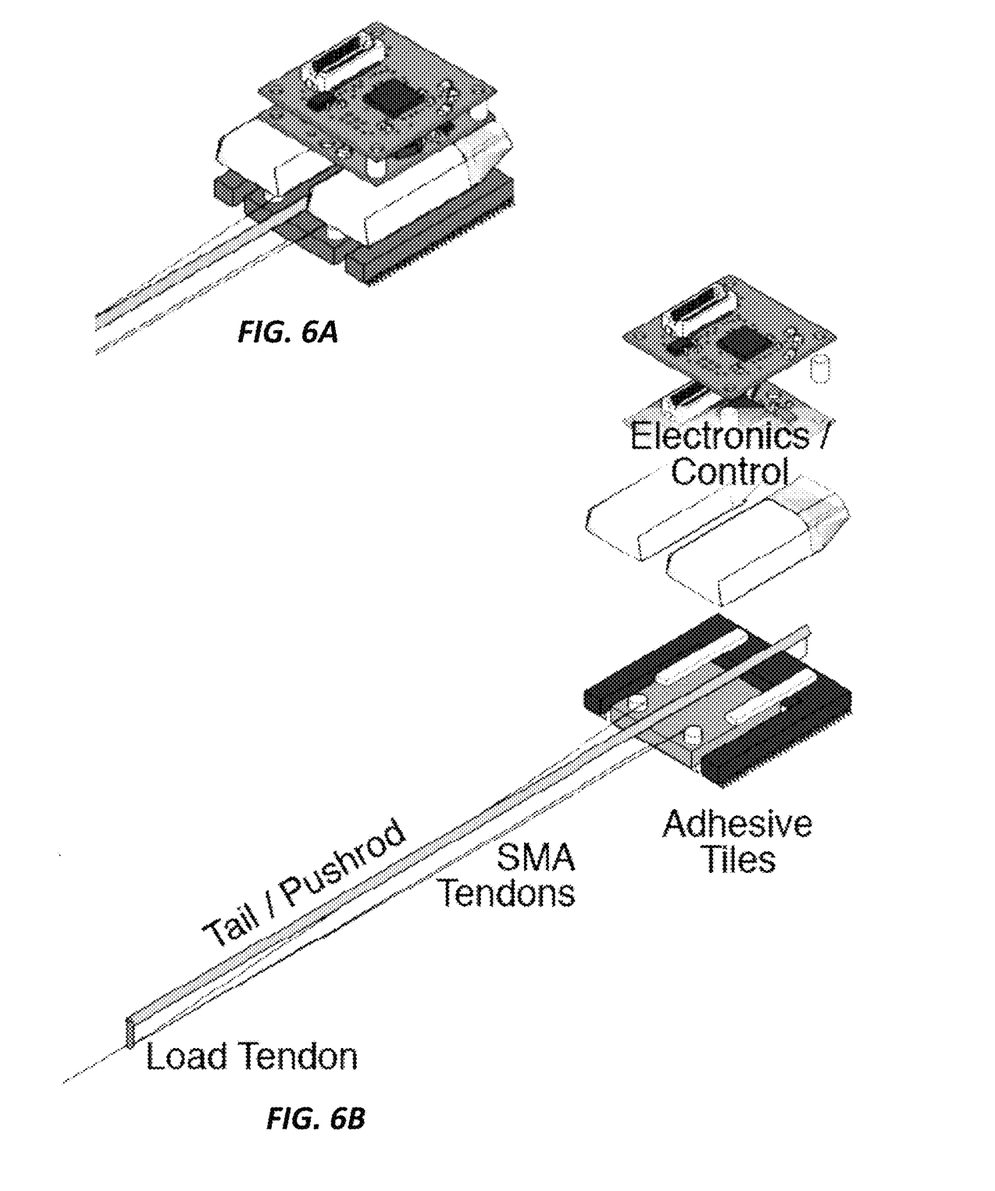
FIGS. 6A-6B show an exemplary SMA walker weighing 4.5 g (without onboard power) moving more than 2.5 kg horizontally on glass, where the higher usable work per stroke of the SMA contributed to the substantially larger payload compared to the piezoelectric prototype, according to one embodiment of the invention.

To better test the force capabilities of the adhesive, an inchworm robot was constructed using SMA as the actuator (FIG. 6). The impressive cycle work capabilities of SMA allowed the robot to generate more than 10N of force with a maximum displacement of 2 mm. The robot was shown to easily drag 2.5 kg on glass, or over 500 times its body mass.

While this robot demonstrates the feasibility of full adhesive force capability at this scale, the weaknesses of SMA are also apparent. The robot could only move at a 0.5 Hz step rate, with a step size of about 3 mm, and was about 0.02% efficient due to the inherently low efficiency of SMA, poor control, and gait inefficiencies.

Electroactive polymers as shown in TABLE I can feasibly achieve the work cycles necessary to drive a robot this size and are an attractive option from a speed and efficiency standpoint. However, the required kilovolt power supply is larger and more complicated than the motor driver used for an SMA system. As power electronics improve electroactive polymers might become a better option in the future.

While the piezoelectric and SMA robots demonstrated important elements of the feasibility of this concept, and both actuator types are well suited to scale to even smaller devices, they are not ideally suited to robots of this size. At length scales near 25 mm, electric motors are an available option, where they have advantages in efficiency and step size.

The use of a continuous-rotation actuator allows the output work cycle to be very large by extending the stroke; the design presented uses a winch, and so the work cycle is limited only by the length of the winch cable. The power density of the motor is much better than SMA, and its implementation requires no complicated electronics like EPAMs or piezoelectrics. A continuous-rotation actuator also permits use of a gearbox to match the motor output to the required adhesive work.

Figure 7:
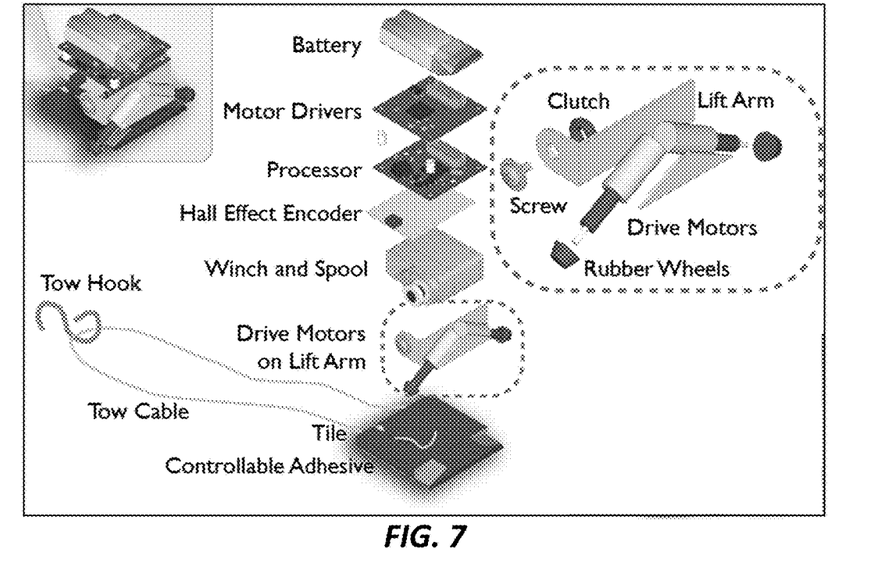
FIG. 7 shows an explosion view of the motor-based μTug demonstration robot, according to one embodiment of the invention.

For this exemplary robot embodiment, a modified commercially available servo was used as the motor and gearbox. As shown in FIG. 7, the bulk of the robot includes the servo as a winch, with a lift arm attached to its output through a friction clutch. The whole assembly sits on a solid 25 mm by 25 mm controllable adhesive tile. The clutch is designed so that when the winch is not tensioning the tow cable, the lift arm is lowered, allowing the two small drive motors to propel the robot. This gives the robot good mobility in both straight lines (6 body lengths per second) and turning (200 deg/sec) on the smooth surfaces it is designed for.

When the robot tows a payload, the winch starts winding the tow cable, which lifts the arm that holds the drive wheels through the friction clutch. This drops the adhesive tile to the ground, allowing it to load. After a completed stroke, the winch reverses and releases the shear force on the adhesive tile; this drops the drive wheels and lifts the adhesive tile off of the surface. The drive wheels and motors maintain slight tension in the towline while the winch unwinds, advancing the robot in preparation for another winch cycle.

This scheme trading contact from tile to uni-directional wheels doubles the towing capability compared to inchworm designs of comparable size by using all of the adhesive area at once. It relies on static friction being sufficient to keep the payload from moving between pulling strokes.

Figure 8A:
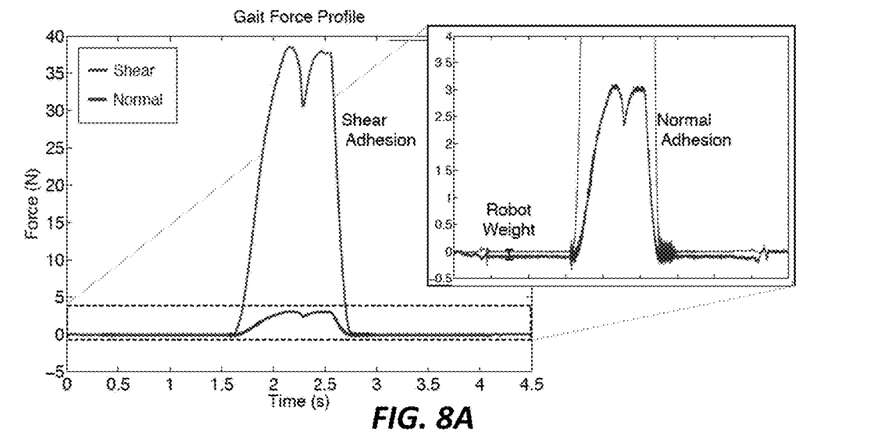

The ground reaction force measured from a single pulling step of the motor based μTug is shown in FIG. 8A. The test was performed by towing 22.5 kg of painted, cast iron weights on glass. The Jug was programmed to take a short step that moved the weight about 1 mm, and the resulting ground reaction forces were measured with a 6-axis ATI Gamma F/T sensor sampled at 500 Hz. The peak shear force generated was just over 38N or about 80% of the peak load predicted from adhesive testing, which corresponds to a normalized performance of 1875 as defined in (2). Note that although an effort was made to pull the weight as close to horizontally as possible, the normal ground reaction force was 3N in the upwards direction. This is an adhesive normal force of over 50 times the robot's body weight. While this would clearly be impossible in a friction based system, it proved no trouble for the controllable adhesive system.

Figure 8B:
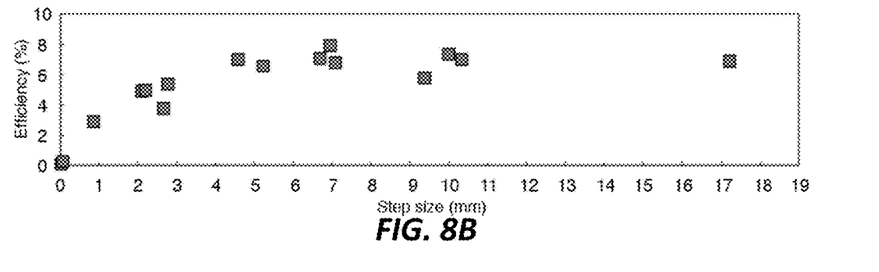
FIG. 8B the efficiency vs step size data for the same robot and setup, where the efficiency reaches a steady state value of about 8% after a step size of 4 mm, according to one embodiment of the invention.

The same setup was used to pull the weight with a variety of step sizes and find the power consumed by the actuator in the process. The current was measured using a shunt resistor, sampling at 100 Hz, and the distance was measured using a dial test indicator with a resolution of about 10 microns. The results shown in FIG. 8B demonstrate the efficiency increases with increased step size up to about 4 mm where the efficiency levels off to about 8%. This is dramatically more than the efficiency figures for either the piezoelectric or SMA μTugs. The 4 mm step size is much larger than any length scale of the adhesives, indicating that the adhesives themselves are not the major source of compliance in this particular robot, which is probably dominated by the spring constant of the gears in the gearbox.

Controllable adhesives make it possible to exert very large interaction forces in comparison to body weight and friction. However, they necessarily consume a certain amount of work and require a certain amount of time to engage and disengage with each loading cycle. In general, taking fewer and longer cycles or steps to cover a given distance is desirable, although this is increasingly difficult to do at small scales. For a given robot size, these considerations favor certain types of actuators over others.

For example, piezoelectric actuators may have difficulty achieving a sufficiently long stroke to engage and disengage the adhesive with each cycle. Walking with many small steps is possible, but reduces speed and efficiency. SMA actuators have a force-displacement profile that is well matched to the needs of controllable directional adhesives, can be very small, and can produce robots with very high interaction forces. However the speed and efficiency are low. If the robot is large enough to use a continuously rotating motor (electromagnetic, piezoelectric or otherwise) and gearbox, the actuation cycle can be tailored to the needs of the adhesive for impressive performance. As expected, the efficiency increases with increasing step size due to the parasitic losses in the loading and unloading of the system including the adhesives as well as all other components that deform with such large loads.

Adhesives with different engagement and disengagement characteristics, and piezoelectric actuator arrays or EPAM actuators are considered within the scope of the current invention.

Since the adhesives do not require normal force to work, and in fact produce adhesion under load, there is no reason the same sort of small robot could not be designed to carry many times its body weight while climbing inclines or even vertical surfaces. In such applications, without the benefit of static friction holding the load in place between steps, some design changes will be need to maintain line tension through the stepping cycle.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example a toy bulldozer could be made to push a load in front of itself instead of the tow designs shown here, or a regular walking robot could use the adhesion simply to reduce slipping while moving or climb steeper inclines. In both cases, the fundamentals discussed would still be necessary. All such variations are considered to be within the scope and spirit of the present invention as defined by the following claims and their legal equivalents.

What is claimed:

1. A method of moving an object using a micro-robot, comprising:
   a. attaching a micro-robot, using a first dry adhesive, to a surface, wherein said dry adhesive comprises micro wedges, wherein said micro wedges are attached to said surface when said micro wedges are in a deformed state;
   b. applying a load to said attached micro-robot advancing said load across said surface;
   c. advancing said micro-robot, using a lifting element, wherein said lifting element comprises a uni-directional footing, wherein said lifting element is disposed to detach said first dry adhesive and advance said micro-robot across said surface while said uni-directional footing is disposed on said surface, wherein said detached first dry adhesive comprises micro wedges in an free-standing state.

2. The method according to claim 1, wherein said advanced load comprises pulling or hoisting said load along said surface.

3. The method according to claim 1, wherein said surface comprises an angle from 0 to 90 degrees.

4. The method according to claim 1, wherein said micro robot comprises a winch, wherein a tether of said winch is connected to said load.

5. The method according to claim 1, wherein said uni-directional footing is selected from the group consisting of a second dry adhesive, and a uni-directional wheel.

6. The method according to claim 1, wherein said microrobot comprises a gate speed in a range of 0 to 60 Hz.

\* \* \* \* \*